United States Patent
Krishnan et al.

(10) Patent No.: US 11,811,102 B2
(45) Date of Patent: Nov. 7, 2023

(54) MATERIAL COMPOSITIONS AND METHODS FOR POROUS GRAPHITE-POLYMER COMPOSITE BIPOLAR PLATES

(71) Applicant: Clarkson University, Potsdam, NY (US)

(72) Inventors: Sitaraman Krishnan, Potsdam, NY (US); Michael Harrington, South Windsor, CT (US); Aswin Prathap Pitchiya, Gloucester, MA (US); Zackary Putnam, Malta, NY (US); Daniel Orlowski, South Windsor, CT (US)

(73) Assignee: Clarkson University, Potsdam, NY (US)

( * ) Notice: Subject to any disclaimer, the term of this patent is extended or adjusted under 35 U.S.C. 154(b) by 0 days.

(21) Appl. No.: 16/558,857

(22) Filed: Sep. 3, 2019

(65) Prior Publication Data
US 2020/0106111 A1 Apr. 2, 2020

Related U.S. Application Data

(60) Provisional application No. 62/726,245, filed on Sep. 1, 2018.

(51) Int. Cl.
| | |
|---|---|
| *H01M 8/0243* | (2016.01) |
| *H01M 8/0234* | (2016.01) |
| *H01M 8/0239* | (2016.01) |
| *H01M 4/62* | (2006.01) |
| *H01M 4/80* | (2006.01) |

(52) U.S. Cl.
CPC ......... *H01M 8/0243* (2013.01); *H01M 4/622* (2013.01); *H01M 4/80* (2013.01); *H01M 8/0234* (2013.01); *H01M 8/0239* (2013.01)

(58) Field of Classification Search
None
See application file for complete search history.

(56) References Cited

U.S. PATENT DOCUMENTS

| | | | | |
|---|---|---|---|---|
| 2002/0136941 A1* | 9/2002 | Bonnet | ................... | H01M 4/96 252/511 |
| 2003/0124414 A1* | 7/2003 | Hertel | ................. | H01M 8/0239 502/180 |

(Continued)

FOREIGN PATENT DOCUMENTS

KR       20080074455 A   *   8/2008

OTHER PUBLICATIONS

Machine English Translation of KR-20080074455-A from Espacenet originally published to Kim Aug. 2008 (Year: 2008).*
Definition of "Article", Dictionary.com (Year: 2016).*

*Primary Examiner* — Ula C Ruddock
*Assistant Examiner* — Mary Grace Byram
(74) *Attorney, Agent, or Firm* — George McGuire

(57) ABSTRACT

The present invention provides compositions and a process for the preparation of porous bipolar plates with pore volume density and pore size that can result in high water uptake by the plates while providing the desired resistance against gas permeation. The combination of porogens (pore-forming agents) with specific types of graphite particles and polymer binders provides the desired characteristics. The porous bipolar plates have high electrical conductivity and flexural strength.

8 Claims, 20 Drawing Sheets

(56) References Cited

U.S. PATENT DOCUMENTS

2016/0289399 A1* 10/2016 Underwood ............... C08J 9/26
2017/0012298 A1* 1/2017 Breault ................. B29C 43/021
2018/0219231 A1* 8/2018 Tanno ................. H01M 8/0234

* cited by examiner

MATERIAL COMPOSITIONS AND METHODS FOR POROUS GRAPHITE-POLYMER COMPOSITE BIPOLAR PLATES

CROSS-REFERENCE TO RELATED APPLICATION

This application claims priority to U.S. Provisional Patent Application Ser. No. 62/726,245, filed on Sep. 1, 2018 and entitled "Material Compositions and Methods for Porous Graphite-Polymer Composite Bipolar Plates," the entire disclosure of which is incorporated herein by reference.

GOVERNMENT FUNDING

N/A

FIELD OF THE INVENTION

The present disclosure is directed generally to a material composition and production method for fuel cell bipolar plates.

BACKGROUND

A bipolar plate is a component used in a fuel cell stack to connect adjacent cells. It electrically connects the anode of a fuel cell, on one side, and the cathode of the adjacent cell, on its other side. The bipolar plate not only serves as an electrical connection in a fuel cell but also plays a key role in distributing oxidant and fuel gas over the active surface area of the membrane-electrode assembly and to keep the oxidant and fuel gas flow streams separate. Bipolar plates account for 15 to 22% of the cost of a fuel cell stack.

Prior research on materials development for bipolar plates has been focused on improving the electrical conductivity, flexural strength, acid resistance, and resistance to gas permeation. In contrast, the present invention pertains to an additional different use of the bipolar plate, namely, in fuel cell water management.

Different approaches have been pursued to address the water management issue in a PEMFC. These including changing the fuel cell process parameters such as the fuel cell temperature and the air/fuel flow rates, installing controllers in the gas humidification system, treating the gas diffusion layer with a hydrophobic agent such as PTFE to change its wetting characteristics, and making changes to the gas flow channel pattern. There are no studies on introducing pore forming agents (porogens) to obtain porous bipolar plates that can drain out excess water from the fuel cell stack.

The operation of a PEMFC involves the reaction of oxygen and hydrogen to generate water and electricity. The chemical reactions that occur in a PEMFC are shown below:

At anode: $2H_2 \rightarrow 4H^+ + 4e^-$

At cathode: $O_2 + 4H^+ + 4e^- \rightarrow 2H_2O$

Overall reaction: $2H_2(g) + O_2(g) \rightarrow 2H_2O(l)$

Thus, liquid water is produced at the cathode during the operation of the fuel cell. Water is also produced by condensation from humidified reactant gas feeds (humidification is required to keep the proton exchange membrane hydrated so that its conductivity does not drop because of drying). The proton transferred from the anode to the cathode brings water of hydration along with it. Because of water accumulation by these processes, the gas channels bringing oxygen to the cathode get flooded with water. Oxygen transport to the fuel cell is blocked, which results in intermittent power losses. Water in the gas flow channels and/or the gas diffusion layer can result in the inhomogeneous and discontinuous distribution of reactants over the active catalyst area. This affects the cell performance and leads to a variation of the cell to cell performance within a stack. Thus, water management is an important issue in PEMFC technology.

Porogen-induced porosity is an effective approach for producing bipolar plates that can address water management in PEMFCs. If the pores are of a suitable diameter, D, and if their surface is hydrophilic, (cos θ>0, where θ is the contact angle of the pore surface with water) they will get filled with water. The interconnected pores can provide a pathway for drainage of water out of the fuel cell. The water within the pores will offer resistance against permeability of hydrogen and its mixing with oxygen.

Accordingly, there is a need in the art for using porogens to control the pore volume density and pore size within the bipolar plates.

SUMMARY

The present disclosure is directed to novel compositions and a process for the preparation of porous bipolar plates with pore volume density and pore size that can result in high water uptake by the plates, while providing the desired resistance against gas permeation. The novelty is in the inventive combination of porogens (pore forming agents) with specific types of graphite particles and polymer binders. The porous bipolar plates have high electrical conductivity and flexural strength.

According to an aspect is a porous fuel cell bipolar plate composition comprising: at least one electrically conductive carbon particles selected from a group consisting of natural-flake graphite, surface-enhanced flake graphite, spherical graphite, primary synthetic graphite, graphene, carbon black, carbon fiber, and carbon nanotubes, having different shapes and distribution of particle sizes; a binder component selected from a group consisting of thermoset and thermoplastic resins; and a pore-forming agent (porogen) selected from a group consisting of water-soluble or thermally-labile compounds including table sugar (sucrose), common salt and poly(ethylene glycol) (PEG).

According to an embodiment, the conductive carbon component comprises 75 wt % to 95 wt % of graphite particles, wherein the wt % concentrations based on the total mass of the graphite and binder.

According to an embodiment, the binder component comprises of 5 wt % to 25 wt % of polymer resin, wherein the wt % concentration based on the total mass of the graphite and binder.

According to an embodiment, the porous fuel cell bipolar plate composition further comprises a porogen selected from the group consisting of table sugar (sucrose), common salt, and poly(ethylene glycol) (PEG), to make the bipolar plate porous.

According to an embodiment, the concentration of the porogen component in the porous fuel cell bipolar plate composition in the range of 2 to 10 parts per hundred parts of the combination of the conductive carbon particles and the binder.

According to an embodiment, the conductive carbon particles have an average particle size in the range of 0.1 μm to 100 μm.

According to an embodiment, the polymer binder is a water-based phenol-formaldehyde or resol resin.

According to an aspect is a method of preparing a porous fuel cell bipolar plate article, the method comprising: providing a composition comprising the combination of: (i) a conductive carbon particles component (75 to 95 wt %); (ii) a polymeric binder (5 to 25 wt %); (iii) a porogen, such as table sugar (sucrose), common salt, poly(ethylene glycol), varied in a range of 2 to 6 parts per hundred parts of the combination of the conductive carbon particles and the binder; preparing a paste or a powder blend of the composition; filling the paste or a powder blend into a mold; heating the mold to obtain a plate precursor; and removing the porogen from the precursor to obtain the porous fuel cell bipolar plate article.

According to an embodiment, the binder and porogen components of the porous fuel cell bipolar plate components are mixed to obtain a solution before being combined with the conductive carbon particles to form a paste.

According to an embodiment, the step of molding the porous fuel cell bipolar plate composition into shape is using the compression molding technique.

According to an embodiment, the step of compression molding is carried out at elevated temperature.

According to an embodiment, the processing temperature range is 100° C. to 300° C.

According to an embodiment, the processing temperature does not exceed 350° C.

According to an embodiment, the processing temperature is in the range of 150° C. to 200° C.

According to an aspect is a porous fuel cell bipolar plate articles, comprising a porous fuel cell bipolar plate composition, comprising: (i) at least one electrically conductive carbon particles selected from a group consisting of natural-flake graphite, surface-enhanced flake graphite, spherical graphite, primary synthetic graphite, graphene, carbon black, carbon fiber, and carbon nanotubes, having different shapes and distribution of particle sizes; (ii) a binder component selected from a group consisting of thermoset and thermoplastic resins; and (iii) a pore-forming agent (porogen) selected from a group consisting of water-soluble or thermally-labile compounds including table sugar (sucrose), common salt and poly(ethylene glycol) (PEG); wherein the pores are characterized by: predetermined physical dimensions measured in terms of mass gain by wicking or vacuum infusion of water, the ability to block gas flow as measured in terms of bubble pressure, high electrical conductivity, and high flexural strength.

According to an embodiment, the electrical conductivity is a minimum of 100 S/cm and as high as 700 S/cm.

According to an embodiment, the bubble pressure is higher than 20 psi and not lower than 10 psi.

According to an embodiment, the porous fuel cell bipolar plate has a wick-fill mass gain in the range of 10 wt % to 25 wt % and vacuum-fill mass gain in the range of 10 wt % to 30 wt %.

According to an embodiment, the relative increase in wick-fill mass gain is in the range of 60% to 70%, and the vacuum-fill mass gain is in the range of 30% to 40% compared with the plate prepared without porogen.

According to an embodiment, the flexural strength is in the range of 25 to 100 MPa.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

LIST OF TABLES

Figure 1:
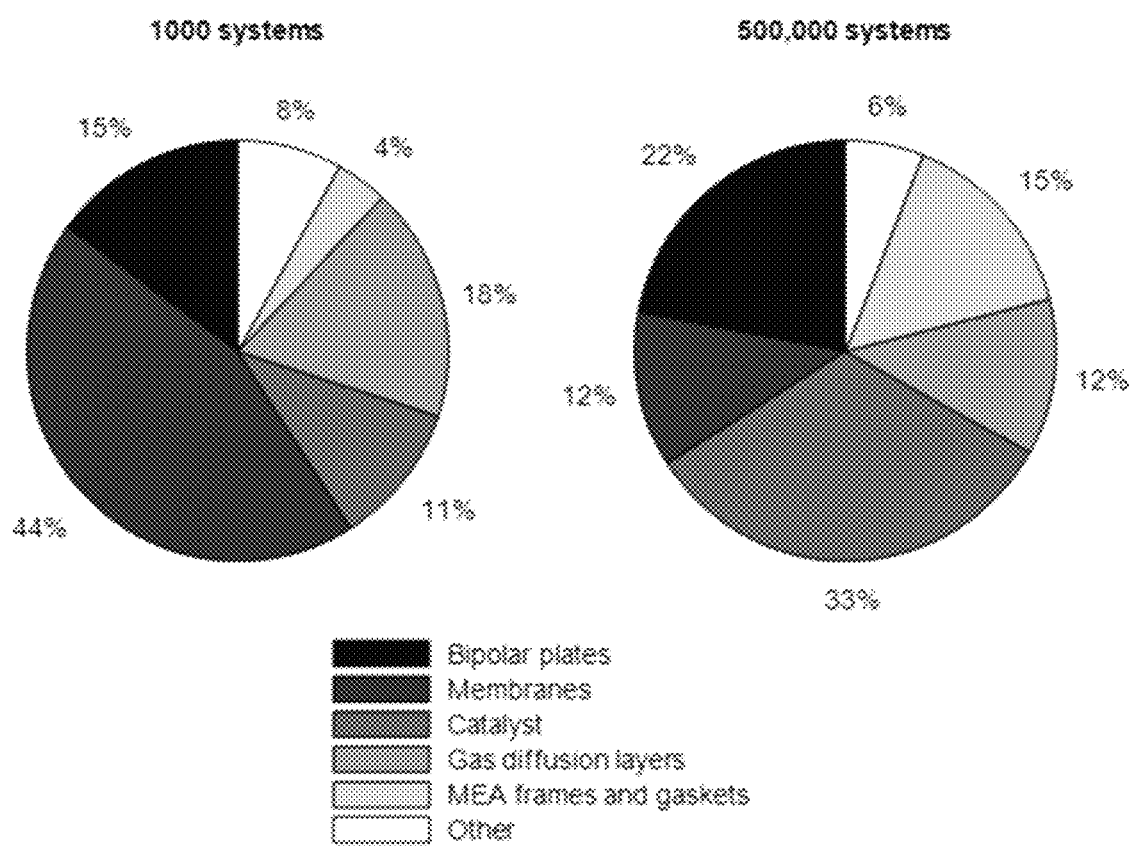
FIG. 1. Cost breakdown for proton exchange membrane fuel cell (PEMFC) stacks comprising of 1000 and 500,000 fuel cells.

TABLE 1. List of carbon particles, polymer binders, and porogens, and their notations.
TABLE 2. Formulations investigating the effects of graphite type and polymer type on composite plate properties.
TABLE 3. Formulations investigating the effects of graphite concentration on composite plate properties.
TABLE 4. Formulations investigating the effects of porogen type on composite plate properties.
TABLE 5. Formulations investigating the effects of graphite concentration and porogen concentration on composite plate properties.
TABLE 6. Formulations investigating the effects of graphite concentration and porogen concentration on composite plate properties.

DETAILED DESCRIPTION OF EMBODIMENTS

The present disclosure describes material compositions and methods for porous graphite-polymer composite bipolar plates Example 1

The composite plates were prepared using a powder blend or paste comprising of one or more conductive graphite particles, one or more binder resin, and at least one type of porogen. A binder is an organic material, generally polymeric in nature, which holds the graphite particles together in the composite. A porogen is a pore-forming agent, which can be removed from the plate, generally by dissolution, to produce pores in the fabricated object. Other particles such as carbon fibers, metals, and ceramics can be included to tailor the mechanical, electrical, and surface properties of the composites.

Graphite particles that can be advantageously used include flake graphite, such as ASBURY CARBONS 3775 surface enhanced flake graphite (Asbury Graphite Mills, Inc., Asbury, N.J.), ASBURY CARBONS HPM850 flake graphite (Asbury Graphite Mills), and ASBURY CARBONS TC301 primary synthetic graphite (Asbury Graphite Mills), and spherical graphite, such as ASBURY CARBONS 3901 (Asbury Graphite Mills).

Binders can be selected from a variety of thermoplastic and thermosetting polymers, preferably phenol formaldehyde resins such as PLENCO 12114 and PLENCO 14043 powders (Plenco, Sheboygan, Wis.), HRJ-16152 and SP-6877 aqueous solutions (SI Group, Schenectady, N.Y.), thermoplastics such as NYLOTEX 200 nylon powder (Micro Powders, Inc., Tarrytown, N.Y.), and reactive polymers such as poly(vinyl alcohol) powders or aqueous solutions such as SELVOL 09-523 and SELVOL E 523S, respectively (Sekisui Speciality Chemicals, Japan).

Porogens that can be advantageously used include table sugar (sucrose), common salt, poly(ethylene glycol) (PEG) and other thermally stable water-soluble polymers, and relatively non-volatile water-soluble liquids.

Other materials that can be added to enhance mechanical and thermal properties include carbon fibers, metal fibers, silica nanoparticles, titania nanoparticles, and surface modifying additives such as polymeric and oligomeric surfactants.

TABLE 1 lists the different carbon particles, binders, and porogens used in the examples that follow. Two types of sugar, namely granulated sugar and powdered sugar (finely ground sugar obtained by milling granulated sugar), were used. The PEG used was of relatively high molecular weight (approx. 10,000 g/mol). AGM94MF0150 is a milled polyacrylonitrile fiber with a carbon content of 94% of higher. It has a nominal size of 150 micrometers and a fiber diameter of 7 to 9 micrometers.

Example 2

Preparation of Composite Plates Using High Surface Area Flake Graphite, Resol Solution in Acetone, and Granulated Sugar Porogen The plates can be prepared using composite manufacturing processes such as laser sintering and compression molding. Compression molding is advantageously used in the present embodiment. Approx. 4.80 g of graphite (ASBURY CARBONS 3775 surface enhanced flake graphite) is measured in a plastic weighing dish. Approx. 1.05 g of the PLENCO 12114 resol powder is added to a glass vial, and dissolved in 4.00 g of acetone using a vortex mixer. Approx. 0.15 g of granulated sugar (DOMINO) is added to the resol soln contained in the vial, and mixed using a vortex mixer. The sugar will not dissolve completely. The graphite powder, and the mixture of resol and sugar in acetone are transferred into a mortar and mixed well using a pestle. A steel compression mold, consisting of 2 inch×2 inch wells, is loaded with the composite paste. Approx. 6.00 g of the composite mixture is distributed equally among each of the four cavities of the mold. The paste is dried, to remove acetone, by placing the mold in an oven at 60° C. for 8 hours. The dried composite is 80.0 wt % graphite, 17.5 wt % resol binder, and 2.5 wt % sugar porogen in composition. The composite mixture is compression molded using a WABASH compression molding press (model no. 25-1212-2TMBX) at a temperature of 170° C. for 20 minutes under an applied load of 10 tons. The compressive pressure in each well of the mold is 5000 psi. Four plates of approximately 2 mm thickness are obtained. The molded plates are immersed in a hot water bath, maintained at 90° C., for 60 minutes, during which water percolates through the plate, removing the porogen and leaving behind a porous structure Example 3

Preparation of Composite Plates Using High Surface Area Flake Graphite, Phenol Formaldehyde Resin Solution in Water, and Granulated Sugar Porogen Approx. 4.80 g of ASBURY CARBONS 3775 graphite is measured in a weighing dish. Approx. 1.3125 g of an aqueous phenol formaldehyde resin solution (HRJ-16152; denoted by PF SOLN) is taken in a glass vial and blended with 4.00 g of deionized water using vortex mixer. Approx. 0.15 g of granulated sugar (DOMINO) is added to this vial and dissolved using a vortex mixer. The graphite powder, and the solution of PF SOLN and sugar in water, are transferred into a mortar, and mixed well using a pestle. The steel compression mold is loaded with the composite paste. Water is evaporated from the paste by placing the mold in an oven at 60° C. for 8 hours. HRJ-16152 resin is approximately 80 wt % solids. Hence, the actual binder mass in the composite is 1.05 g. The composition of the dried composite, before compression molding, is 80 wt % graphite, 17.5 wt phenol-formaldehyde resin, and 2.5 wt % sugar porogen. The composite powder is compression molded at a temperature of 170° C. for 20 minutes at 10 tons load. Extraction of porogen is achieved by immersing the molded plates in a hot water bath maintained at 90° C. for 60 minutes.

Example 4

Preparation of Composite Plates Using High Surface Area Flake Graphite, Poly(Vinyl Alcohol) Solution in Water, and Sodium Chloride Salt Porogen Approx. 4.80 g of ASBURY CARBONS 3775 graphite is measured in a weighing dish. Approx. 11.67 g of aqueous solution of poly(vinyl alcohol) (SELVOL 09-523; denoted by PVA SOLN) is taken in a glass vial and blended with 4.00 g of deionized water using a vortex mixer. Approx. 0.15 g of sodium chloride salt (FISHER SCIENTIFIC) is added to the vial containing the PVA soln and dissolved using a vortex mixer. The graphite powder, and the solution of PVA SOLN and salt in water, are transferred into a mortar, and mixed well using a pestle. The steel compression mold is loaded with the composite paste. Water is evaporated from the paste by placing the mold in an oven at 60° C. for 8 hours. SELVOL 09-523 is approximately 9 wt % solids. Hence, the actual binder mass in the composite is approximately 1.05 g. The composition of the dried composite, before compression molding, is 80 wt % graphite, 17.5 wt % poly(vinyl alcohol), and 2.5 wt % salt porogen. The powder is compression molded at a temperature of 300° C. for 30 minutes under a load of 10 tons. Extraction of porogen is achieved by immersing the molded plates in a hot water bath maintained at 90° C. for 60 minutes.

Example 5

Preparation of Composite Plates Using High Surface Area Flake Graphite, Resol Powder Binder, and PEG Porogen.

Approx. 4.80 g of ASBURY CARBONS 3775 graphite is measured in a weighing dish. Approx. 1.05 g of the resol powder binder (PLENCO 12114) is separately weighed in another weighing dish. Approx. 0.15 g of solid poly(ethylene glycol) (PEG) with a molecular weight of approx. (purchased from SIGMA-ALDRICH) is taken is in a third weighing dish. The graphite powder, the resol binder, and the PEG porogen are mixed using a BLACK+DECKER BL1110 blender for about 5 minutes. The composite powder is transferred to the steel mold and pressed at a temperature of 170° C. for 30 minutes at 10 tons load. The plates are immersed in water at 90° C. for 60 minutes to remove the porogen.

Example 6

Preparation of Composite Plate Using High Surface Area Flake Graphite, Phenol Formaldehyde Resin Solution in Water, and Granulated Sugar Porogen at Different Concentrations Approx. 4.80 g of ASBURY CARBONS 3775 graphite is measured in a weighing dish. Approx. 1.0613 g of HRJ-16152 aqueous solution of phenol formaldehyde resin is taken in a glass vial and blended with 4.00 g of deionized water using a vortex mixer. Approx. 0.339 g of granulated sugar is added to this solution and dissolved using a vortex mixer. The graphite powder, and the solution of binder and porogen in water, are transferred to a mortar and mixed well using a pestle to obtain a composite paste. A steel mold is filled with the paste, after which the paste is dried at 60° C. for 8 hours in an oven. The resulting dry powder is compression molded at a temperature of 170° C. for 20 minutes under a load of 10 tons. The plates are immersed in water at 90° C. for 60 minutes to remove the porogen.

The resin concentration in HRJ-16152 is 80 wt %. Hence, the actual mass of resin in the powder composite is approx. 0.85 g. Thus, the total mass of graphite and binder is approx. 5.65 g, and the mass of porogen is 6% of this mass, that is, 0.339 g.

For porogen concentration variation studies the graphite to binder ratio was fixed to be 85 parts to 15 parts and the porogen concentration was varied from in the range of 0 to 6 phr (0 to 0.339 g). Here, phr represents parts of porogen per hundred parts of graphite and binder. Thus, all the plates in the porogen concentration variation study had the same graphite and binder concentrations after removal of the porogen.

Example 7

Preparation of Composite Plates Using High Surface Area Flake Graphite, Carbon Fiber, Resol Powder Binder, and PEG Porogen Approx. 5.10 g of ASBURY CARBONS 3775 graphite, 0.15 g of carbon fiber (ASBURY CARBONS AGM94MF150), 1.05 g of resol binder (PLENCO 12114 powder), and 0.15 g of poly(ethylene glycol) porogen (10, 000 g/mol PEG solid) are mixed in BLACK+DECKER BL1110 blender for 5 minutes. The steel mold cavity is filled with the composite powder and pressed at a temperature of 170° C. for 30 minutes under a load of 10 tons. After molding, the plates are immersed in water at 90° C. for 60 minutes to extract out the porogen.

Example 8

Investigation of the Effects of Graphite Type and Concentration, Binder Type and Concentration, and Porogen Type and Concentration on Properties of Composite Plates Several plates were prepared using the combination of ingredients given in TABLE 1, by procedures similar to those illustrated in Examples 2 to 7. The plate compositions and properties are given in TABLES 2 to 6.

TABLE 2 gives the results of the study in which the graphite type and binder type is varied and no porogen is used. The graphite and binder concentrations are 80.0 wt % and 20.0 wt %, respectively.

TABLE 3 lists the studies in which different concentrations of the high surface area flake graphite (ASBURY CARBONS 3775) are used in combination with different binders. No porogen is used during the production of the plates reported in this table.

In TABLE 4, a fixed concentration of carbon particles (80.0 wt %), binder (17.5 wt %), and porogen (2.5 wt %) is used. Primarily, the binder type and porogen type is varied.

In the formulations listed in TABLE 5, the high surface area graphite (ASBURY CARBONS 3775) is used along with the HRJ-16152 phenol formaldehyde resin solution and granulated sugar porogen. The graphite concentration is investigated at three levels, namely, 80 wt %, 85 wt % and 90 wt %. The corresponding binder concentrations are 20 wt %, 15 wt %, and 10 wt %, respectively. The concentration of granulated sugar is varied in the range of 0 to 6 parts per hundred parts of graphite and binder. Four plates of each composition were prepared and characterized to determine measurement uncertainties.

TABLE 6 reports a similar study, using solution the PLENCO 12114 resol powder in acetone, instead of HRJ-16152.

Example 9

Measurement of wick-fill and vacuum-fill mass gain and bubble pressure.

The wick-fill mass gain is defined as the relative gain in mass of a pre-dried porous plate, because of uptake of water, by wicking process, at atmospheric pressure. The vacuum-fill mass gain is the relative gain in mass of a pre-dried plate, because of uptake of water, when water is drawn into the plate using vacuum suction. The wick-fill bubble pressure is the pressure required to force a gas (air) to pass from one side of the wick-filled plate to the other side; the permeation of compressed air through the plate is experimentally observed in the form of bubbles. The vacuum-fill bubble pressure is the pressure required to force a gas (air) to pass from one side of the vacuum-filled plate to the other side.

The vacuum-fill mass gain of a given plate will be higher than the wick-fill mass gain, and the vacuum-fill bubble pressure will be higher than the wick-fill bubble pressure. The wick-fill mass gain is proportional to the fraction of the pore volume that can be accessed by water, purely by means of capillary forces. The vacuum-fill mass gain is proportional to the total porosity of the plate. A higher value of wick/vacuum-fill bubble pressure indicates a greater resistance to gas permeability.

All the plates were dried at 60° C. in a vacuum oven, before doing wick-fill and vacuum-fill measurements. Measurements on four identical plates were used to determine the average and standard deviation (reported as uncertainty). The wick-fill mass gain was determined by immersing a pre-dried plate in deionized water at atmospheric pressure for 10 minutes, after which the specimen was removed from water, gently patted with Kimwipe to remove water droplets adhered to the surface of the plate, and weighed using a microbalance (Mettler Toledo, Model XS64) to determine the mass gain. Next, bubble pressure measurements were made for wick-filled samples using the setup shown in FIG. 2.

For the vacuum fill measurements, a pre-dried plate was placed in a Petri dish containing deionized water and the assembly was placed in an evacuated chamber (Thermo Scientific Lindberg/Blue M vacuum oven connected to a Welch DuoSeal vacuum pump) at room temperature. The port of the vacuum oven, connected to the pump, was kept closed and the pump was switched on. The knob was then slowly opened until the dial indicator on the vacuum oven showed a value of 30 inHg. The vacuum pump was switched off after 10 minutes, air was let inside the oven, and the specimen was removed. The vacuum-filled plate was gently patted with Kimwipe to remove adhered water droplets at the surface and weighed using a microbalance to determine the vacuum fill mass gain. This was followed by the measurement of the vacuum fill bubble pressure, using the set-up shown in FIG. 2.

Figure 2:
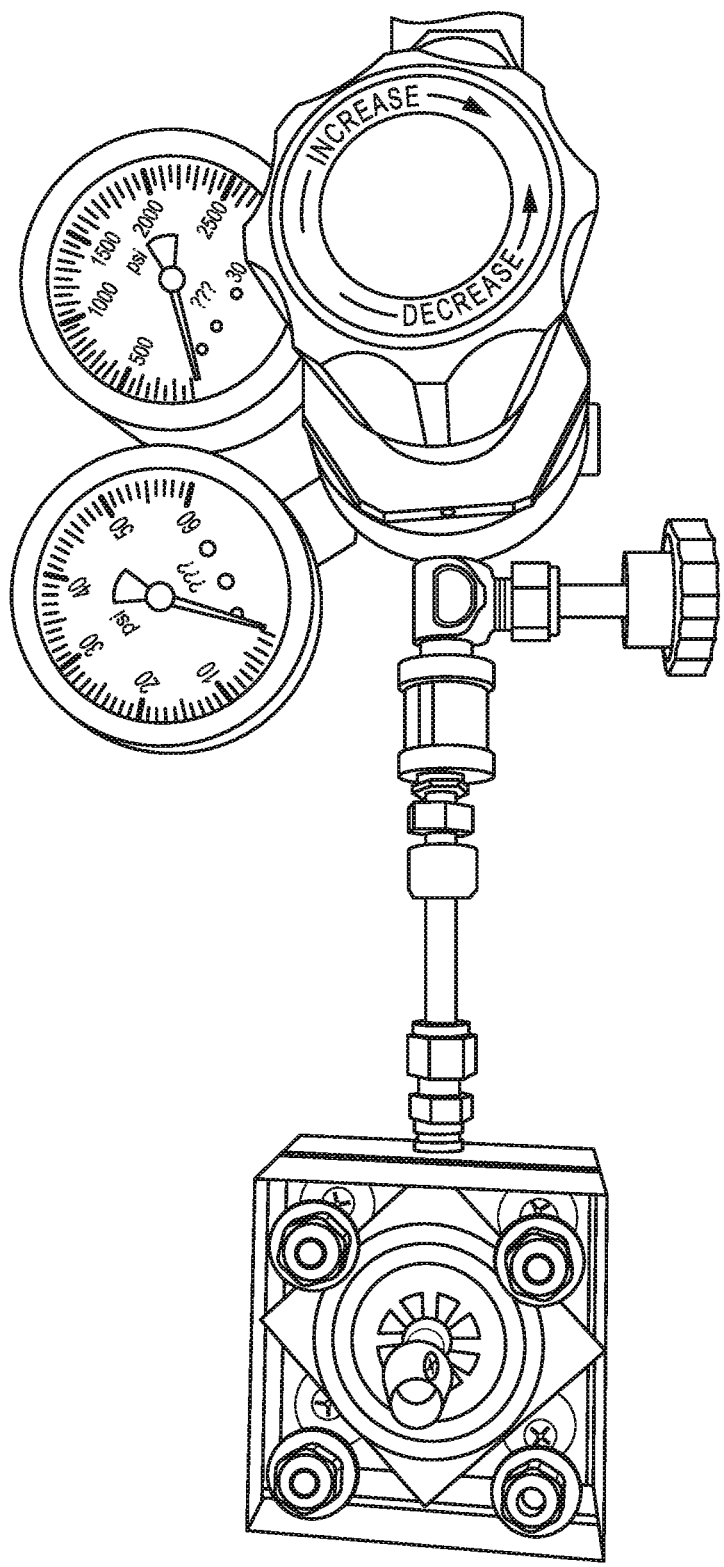
FIG. 2. Photograph of the wick-fill and vacuum-fill bubble pressure measurement setup.

To characterize the gas-blocking ability of the composite plates, bubble pressure measurement was made using the setup shown in FIG. 2. The test plate was placed in the apparatus with seals and air pressure was applied from one side of the plate. The pressure was gradually increased until the gas bubbles were observed at the outlet port on the other side. The highest applied pressure that did not result in the formation of a bubble was recorded as the bubble pressure.

Figure 3:
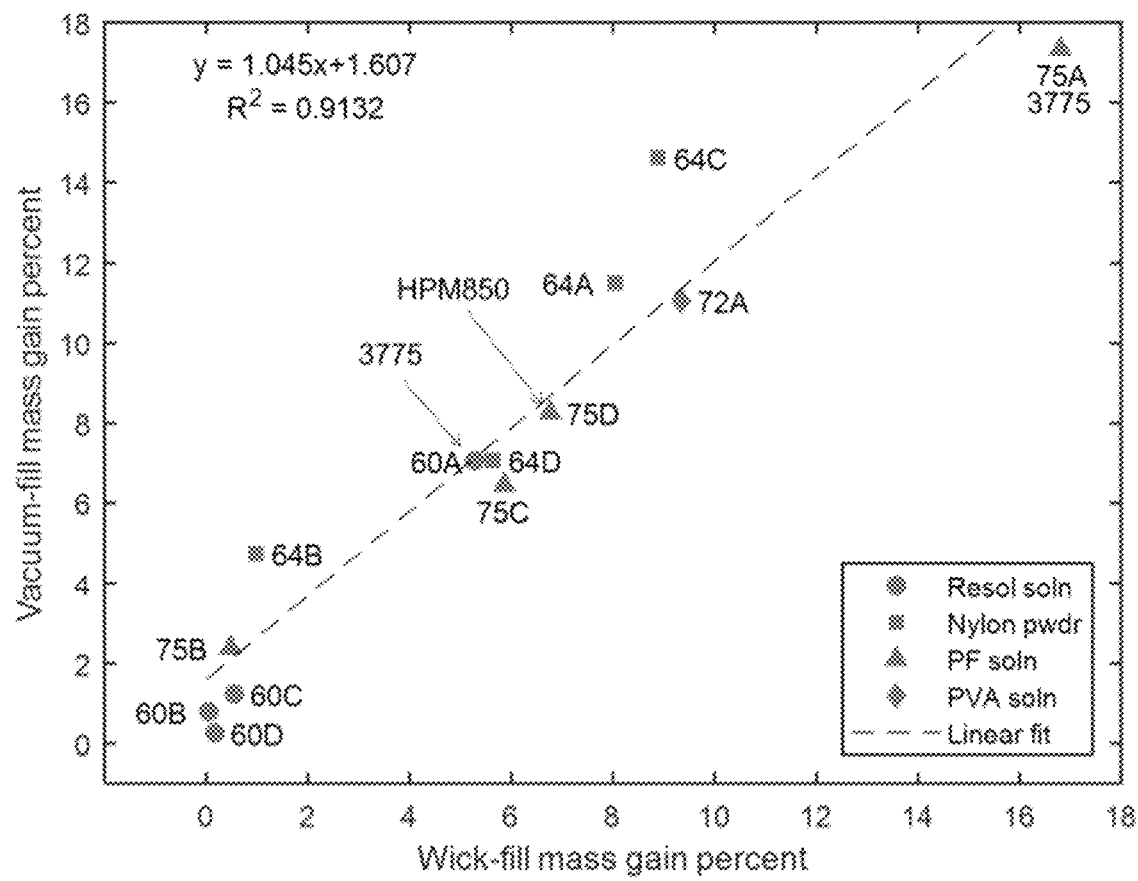
FIG. 3. Plot of wick-fill mass gain percent vs. vacuum-fill mass gain percent of plates prepared using different types of graphite powders.

FIG. 3 shows a plot of the vacuum-fill mass gain vs. wick-fill mass gain for compositions given in TABLE 2. The data reported in this figure were acquired from plates having the same concentration of graphite (80 wt %) and polymer binder (20 wt %), but the graphite type and binder type were varied. A linear correlation between vacuum-fill and wick-fill mass gains is observed. It is seen that for RESOL SOLN, only the high surface area flake graphite (ASBURY CARBONS 3775) showed reasonable wick-fill and vacuum-fill mass gains, compared with the other graphite types. The porosity was very low for the other three graphite grades. With PF SOLN, all the graphite types, except 3901, showed wick- and vacuum-fill mass gains higher than 5%. The highest mass gain, and hence the porosity, was obtained using the 3775 graphite.

Figure 4:
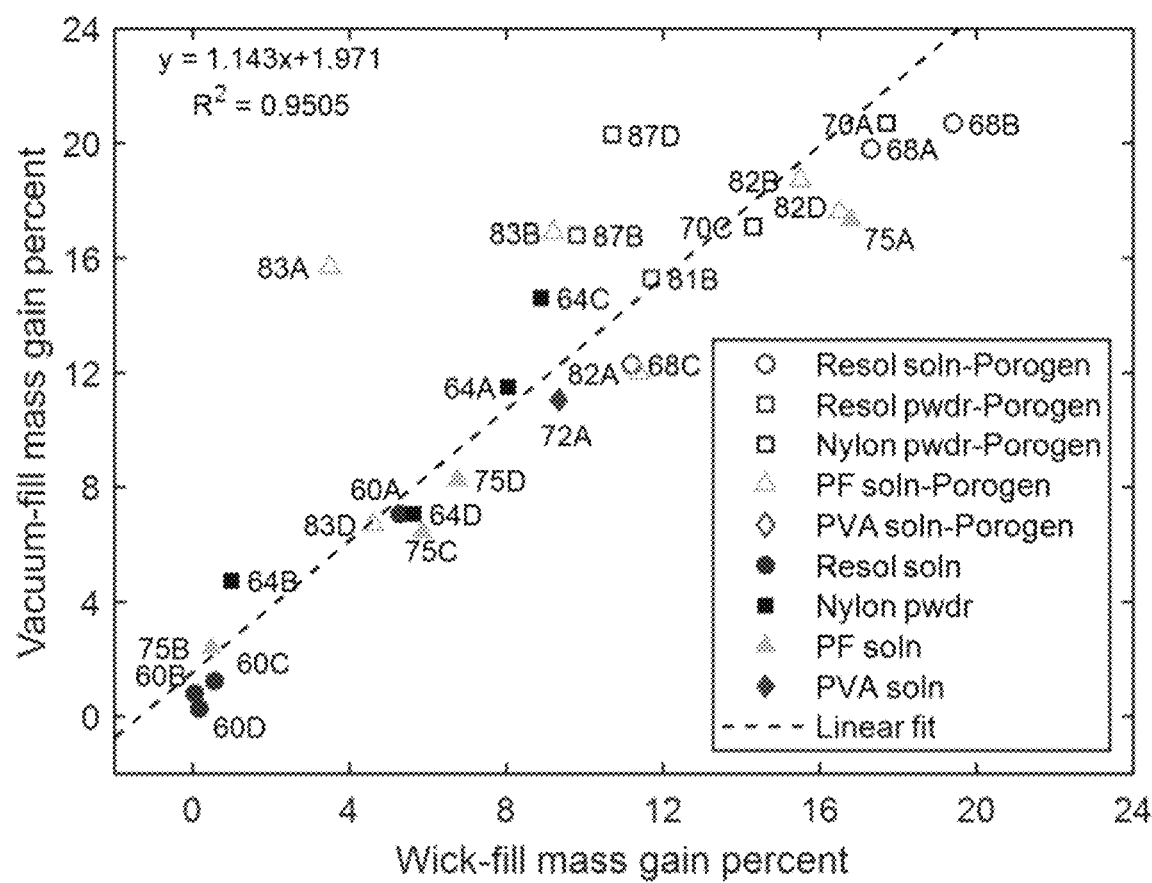
FIG. 4. Plot of wick-fill mass gain percent vs. vacuum-fill mass gain percent of plates prepared using different types of graphite powders, with no porogen and with porogen.

FIG. 4 demonstrates the effect of porogen on increasing the wick-fill and vacuum-fill mass gains. The results for plates prepared without porogen (TABLE 2) and plates prepared using granulated sugar porogen (2.5 wt %; see TABLE 4) are superimposed in this figure. The plates that were prepared using the porogen (unfilled symbols in the figure) are seen to generally have higher wick-fill and vacuum-fill mass gains that those prepared in the absence of the porogen.

Example 10

Effect of Porogen Type and Binder Type on Wick-Fill and Vacuum-Fill Mass Gain

Figure 5:
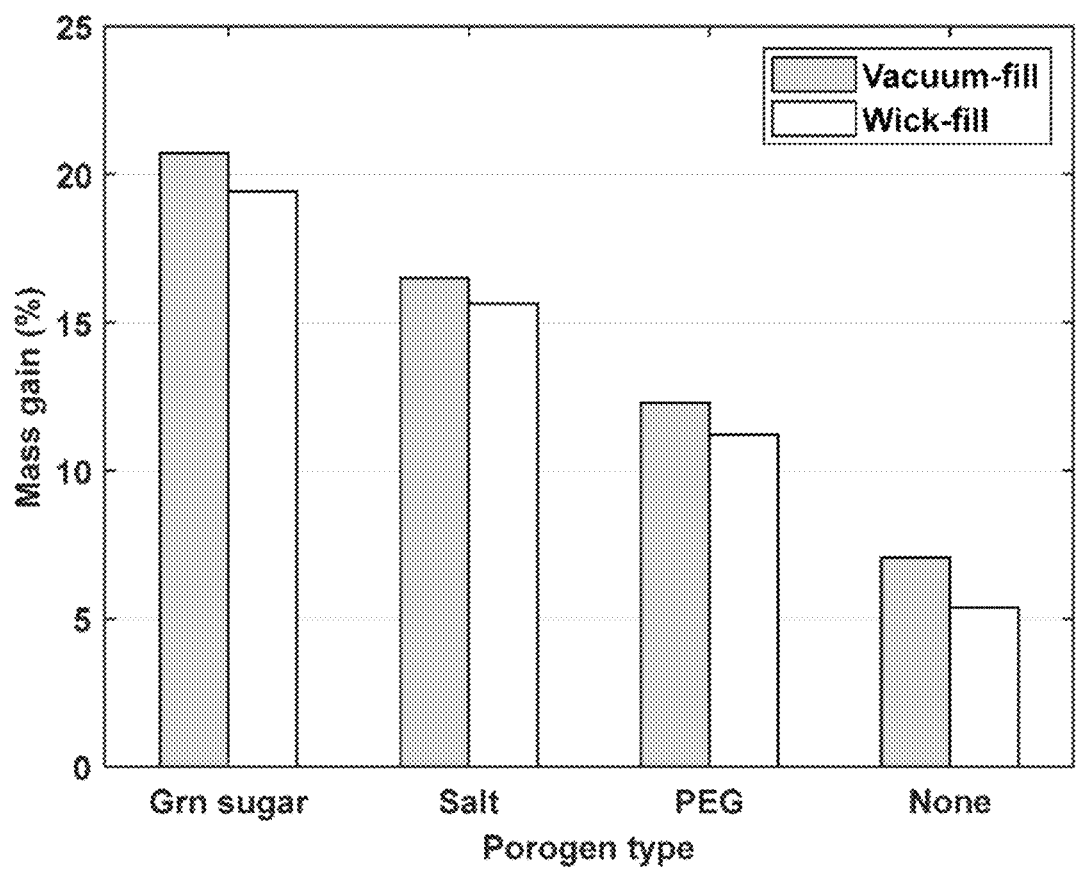
FIG. 5. Effect of porogen type (sugar, salt or PEG) on wick-fill and vacuum-fill mass gains of composite plates based on RESOL SOLN and 3775 graphite.
Figure 6:
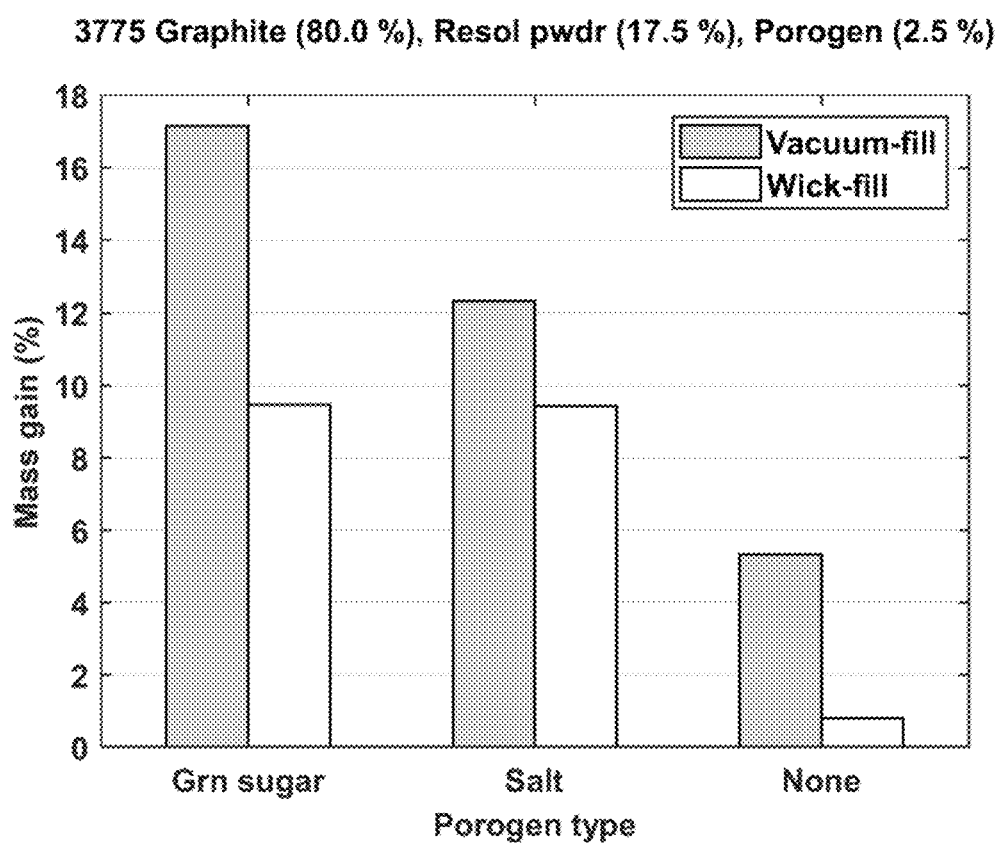
FIG. 6. Effect of porogen type (sugar, salt or PEG) on wick-fill and vacuum-fill mass gains of composite plates based on RESOL PWDR and 3775 graphite.
Figure 7:
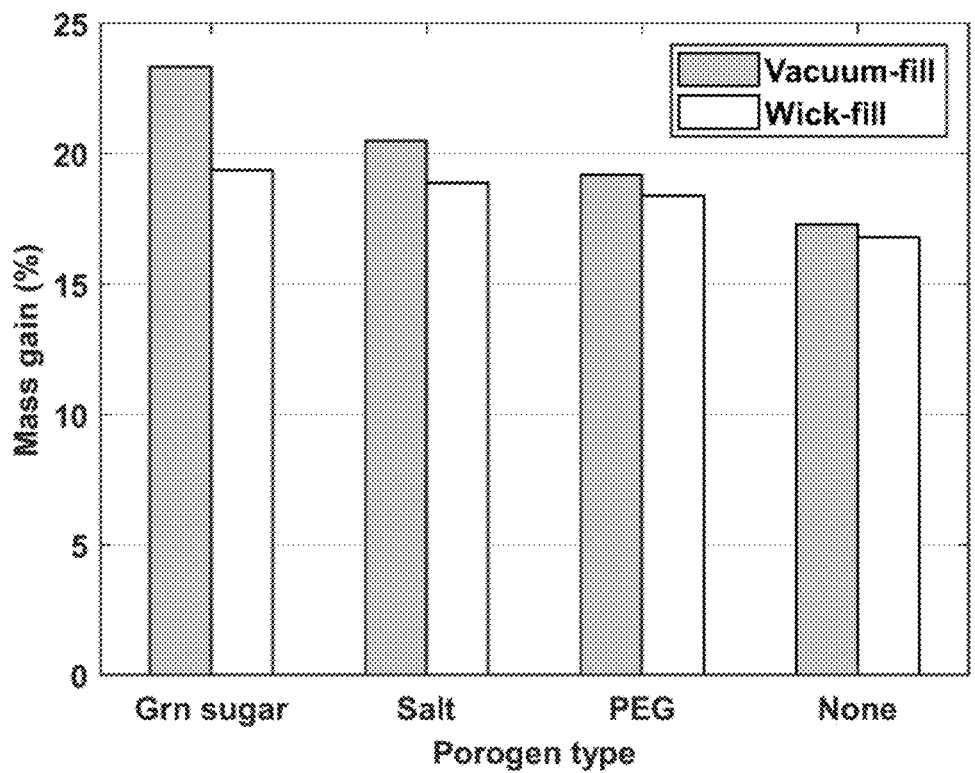
FIG. 7. Effect of porogen type (sugar, salt or PEG) on wick-fill and vacuum-fill mass gains of composite plates based on PF SOLN and 3775 graphite.
Figure 8:
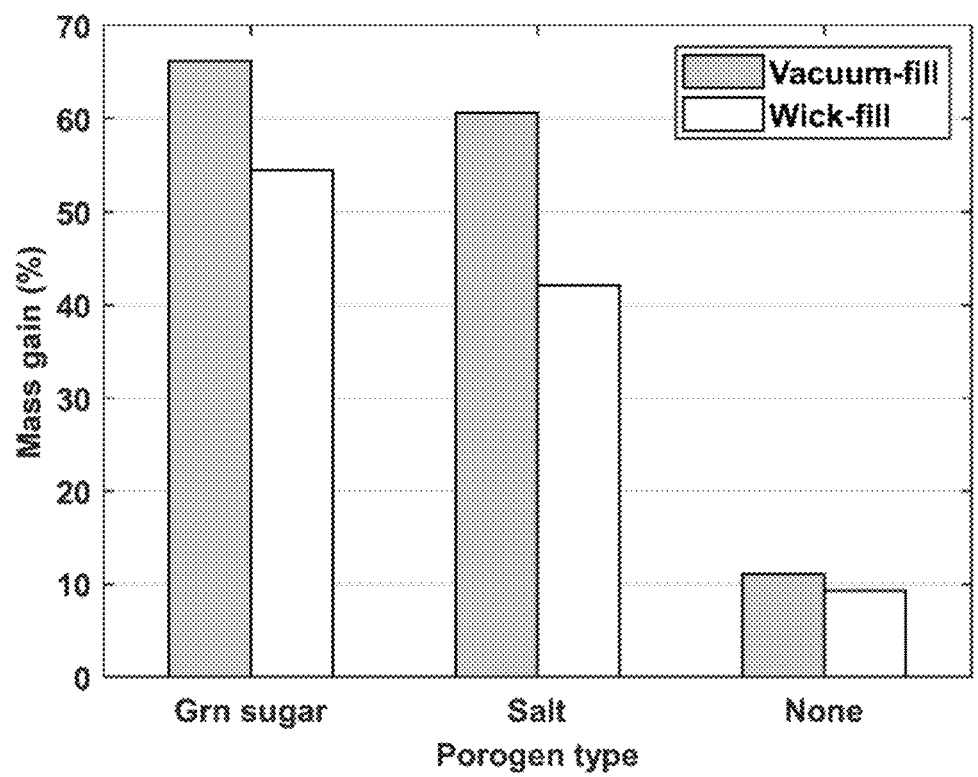
FIG. 8. Effect of porogen type (sugar, salt or PEG) on wick-fill and vacuum-fill mass gains of composite plates based on PVA SOLN and 3775 graphite.
Figure 9:
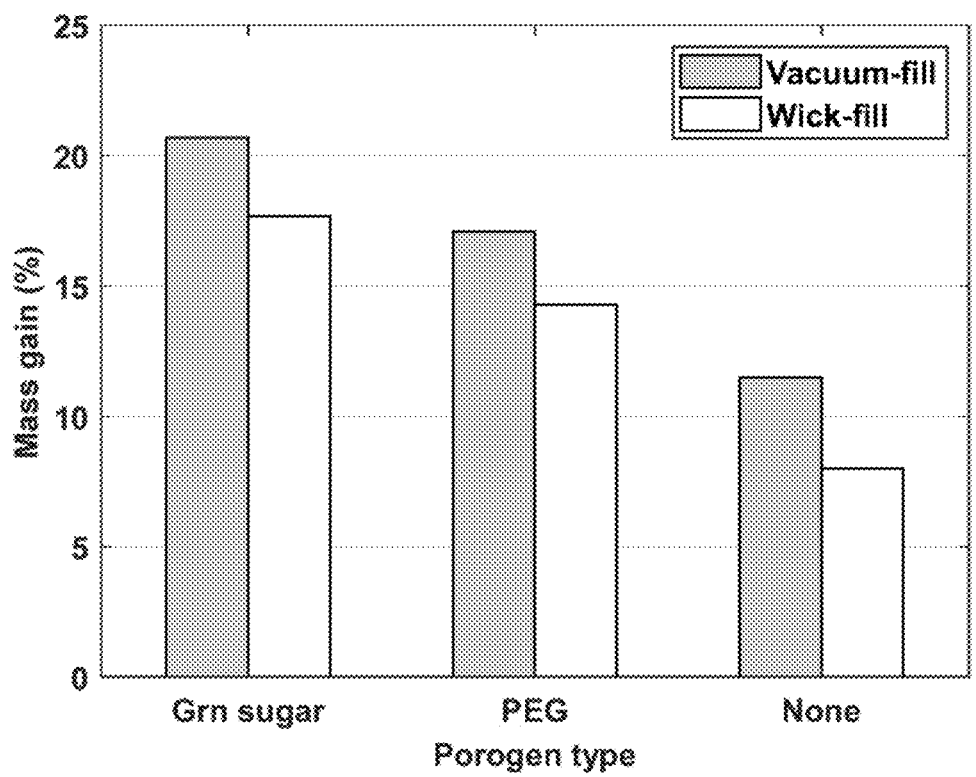
FIG. 9. Effect of porogen type (sugar, salt or PEG) on wick-fill and vacuum-fill mass gains of composite plates based on NYLON PWDR and 3775 graphite.

FIG. 5 shows the wick-fill and vacuum-fill mass gain percentages of composite plates prepared using the high surface area flake graphite, ASBURY CARBONS 3775 (80.0 wt %), the PLENCO 12114 resol (17.5 wt %) dissolved in acetone, and each of the three different porogens, namely, granulated sugar, salt, and PEG (2.5 wt %). A plate prepared using 3775 graphite (80.0 wt %) and the resol binder (20.0 wt %) is also included for comparison. The wick-fill and vacuum-fill mass gains are significantly higher for the plates prepared using the porogens, compared with the reference plate, clearly indicating the formation of pores. The plate prepared using granulated sugar has the highest porosity, and a vacuum fill mass gain higher than 20 wt %.

FIG. 6, FIG. 7, FIG. 8, and FIG. 9 show similar results for plates prepared using the PLENCO 12114 resol powder directly (without dissolving it in acetone), the HRJ-16152 phenol formaldehyde resin solution in water, the SELVOL 09-523 poly(vinyl alcohol) solution in water, and the NYLOTEX 200 nylon powder, respectively. In each case, the plates prepared using a certain binder, with the PEG, salt, or sugar porogen, has higher wick-fill and vacuum-fill mass gains, that is, porosity, compared to the plates prepared without using a porogen. The plates prepared using the poly(vinyl alcohol) binder exhibit a significantly higher water up-take compared with plates prepared using the other binders. The higher wick-fill and vacuum-fill mass gain is attributed to the hydrophilicity of the vinyl alcohol groups in the partially dehydrated polymer.

Figure 10:
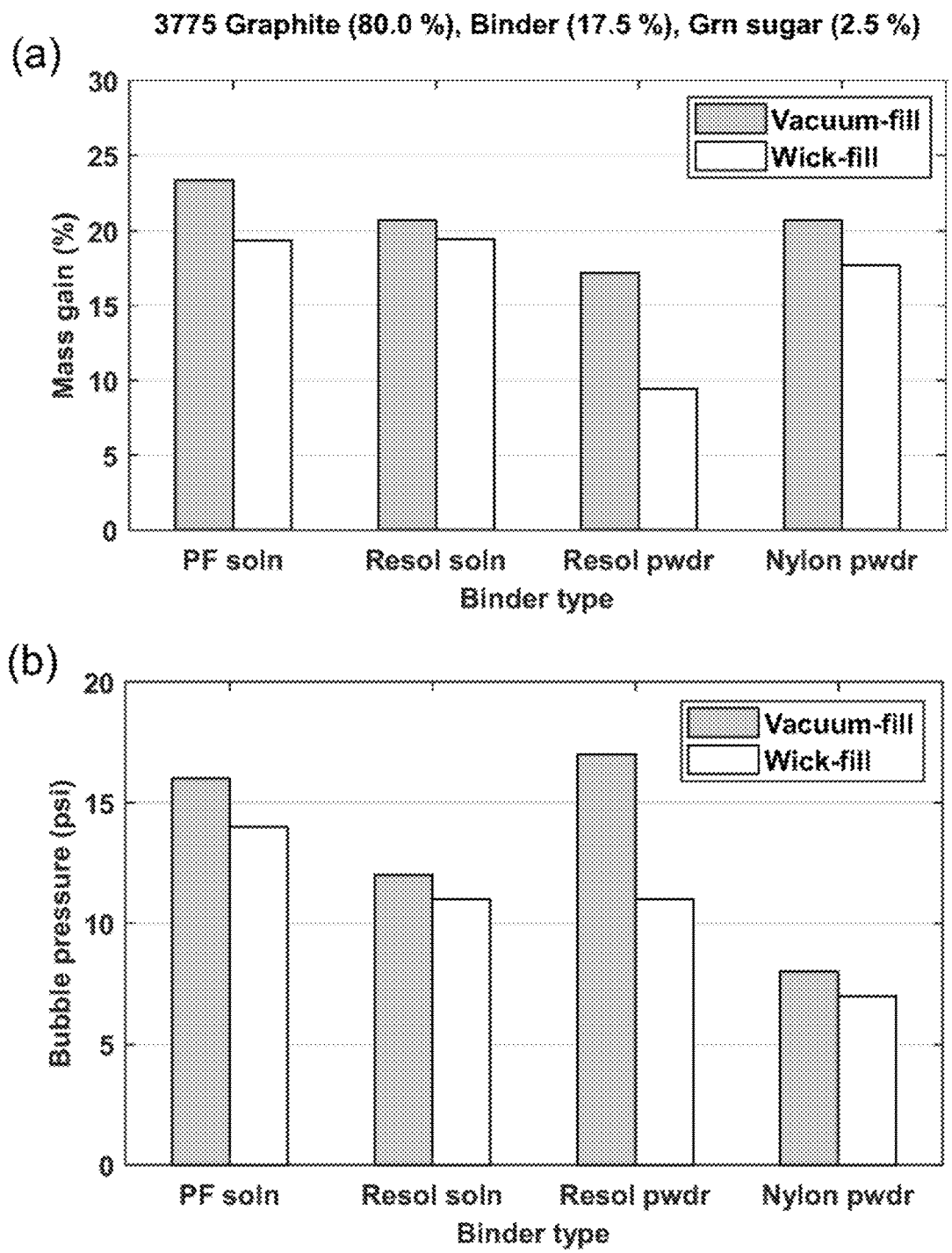
FIG. 10. Effect of binder (polymer) type on wick-fill and vacuum-fill mass gains and bubble pressures of graphite plates prepared using granulated sugar as porogen; 80.0 wt % graphite, 17.5 wt % binder, and 2.5 wt % porogen.

FIG. 10 gives a comparison of plates prepared using the 3775 graphite (85 wt %), one of the four different types of binders (at 17.5 wt % concentration), and granulated sugar porogen (2.5 wt %). The plate prepared using the HRJ-16152 phenol formaldehyde resin solution (denoted by PF SOLN) has the highest vacuum-fill mass gain (see FIG. 10a), indicating the highest porosity amongst the plates compared in this figure. The vacuum-fill mass gains of plates using RESOL SOLN and NYLON PWDR binders are comparable, but the former has higher wick-fill and vacuum-fill bubble pressures (see FIG. 10b). The plate prepared using RESOL PWDR (PLENCO 12114 resol powder) has the lowest porosity and the highest vacuum-fill bubble pressure. The plate obtained using PF SOLN has the desired combination of high wick-fill and vacuum-fill mass gains as well as high bubble pressures.

Figure 11:
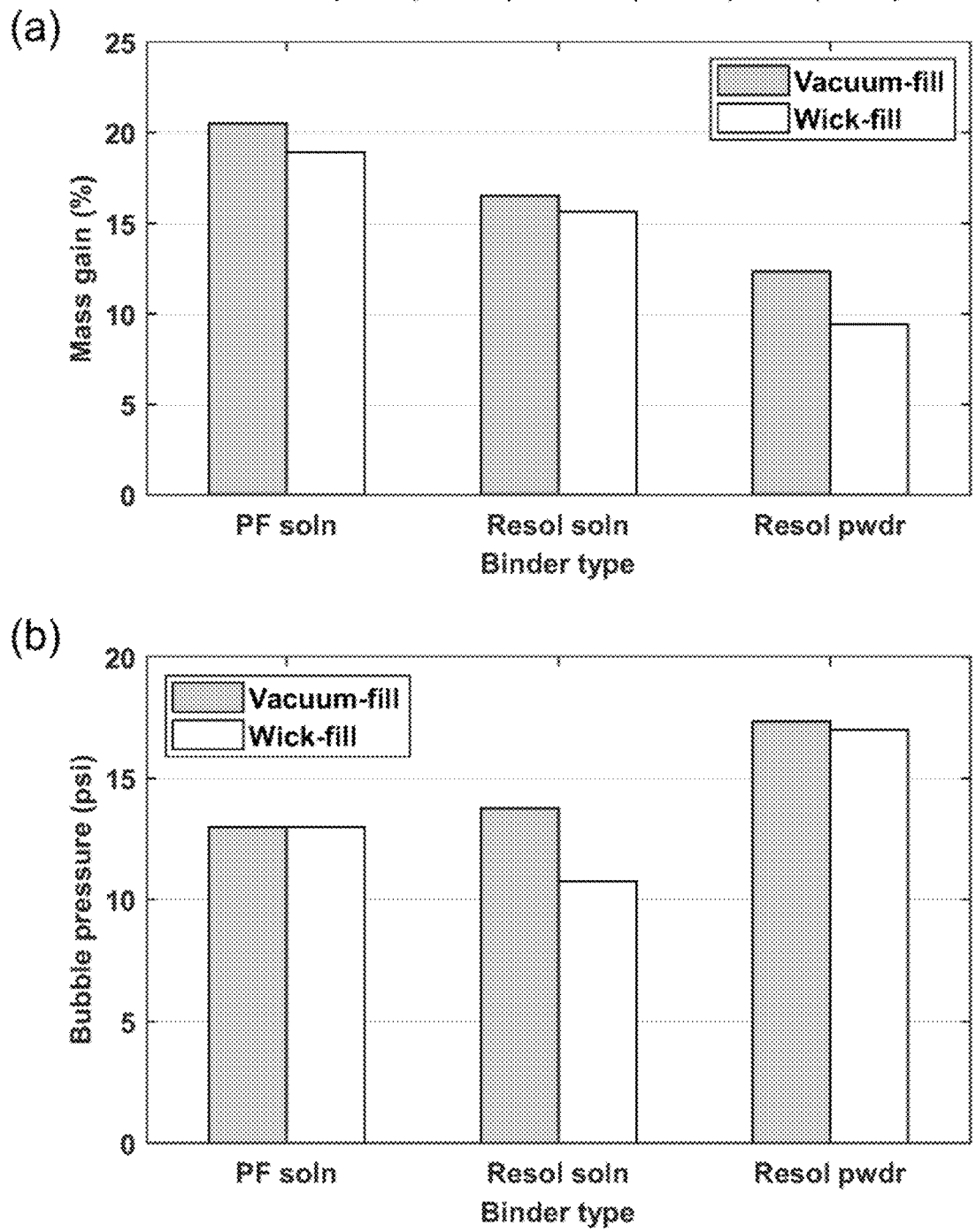
FIG. 11. Effect of binder (polymer) type on wick-fill and vacuum-fill mass gains and bubble pressures of graphite plates prepared using sodium chloride salt as porogen; 80.0 wt % graphite, 17.5 wt % binder, and 2.5 wt % porogen.

FIG. 11 compares plates prepared using PF SOLN, RESOL SOLN, and RESOL PWDR as binders, and salt particles as porogens. As in the case of granulated sugar porogen, the plate prepared using PF SOLN binder has the highest wick-fill and vacuum-fill mass gain percentages, compared with the other two binders. The plate prepared using RESOL PWDR, with lower porosity, showed the expected higher wick-fill and vacuum-fill bubble pressures.

Example 11

Figure 12:
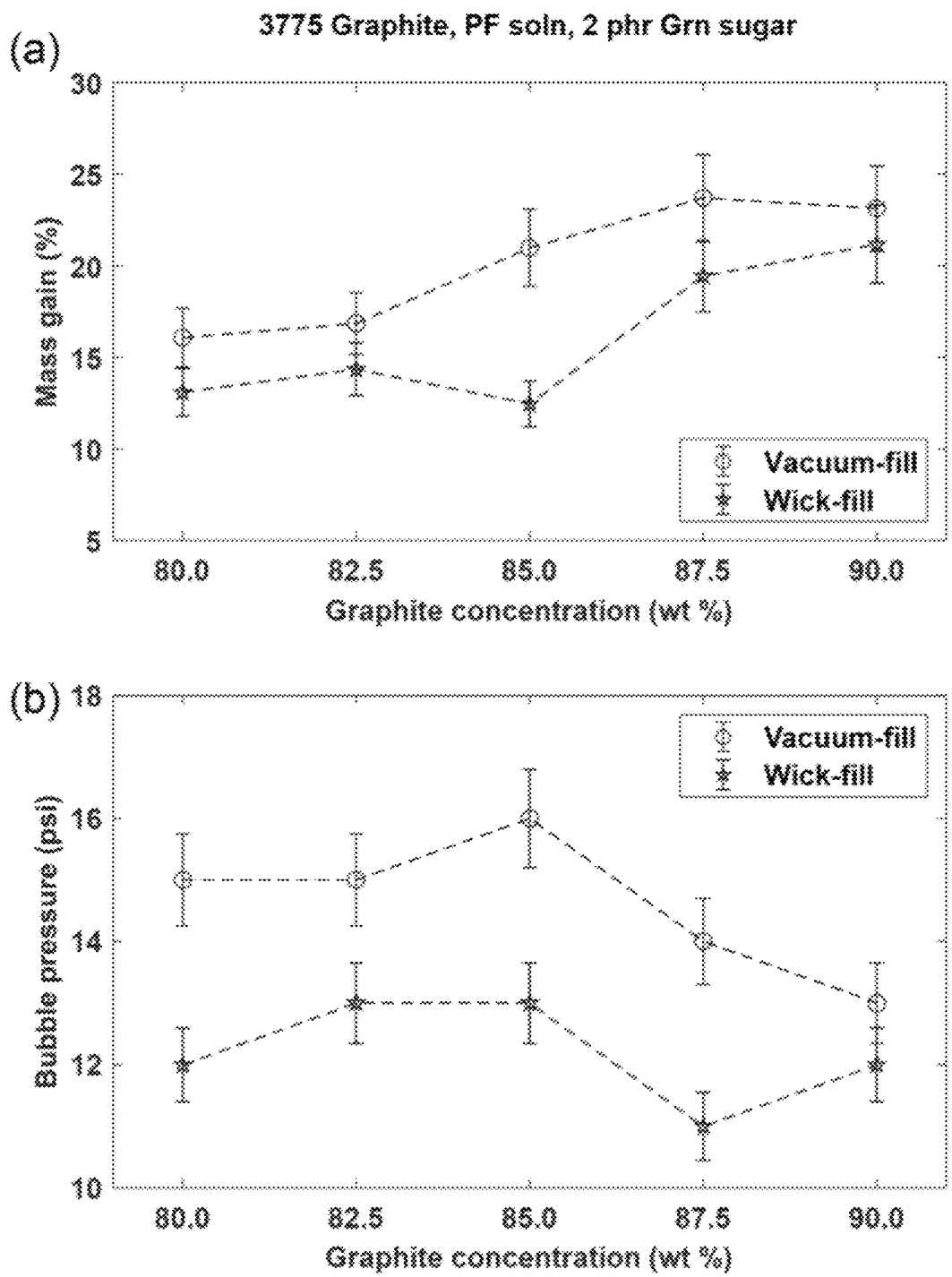
FIG. 12. Effect of 3775 graphite concentration on the wick-fill and vacuum-fill mass gains and bubble pressures of plates prepared using PF SOLN and 2 phr of granulated sugar porogen.

Effect of Graphite Concentration on Wick-Fill and Vacuum-Fill Mass Gains and Bubble Pressures in Graphite and Phenol Formaldehyde Resin Composite Plates Prepared Using Sugar Porogen FIG. 12 shows the results for five different plate compositions, comprising of 3775 graphite concentrations in the range of 80 to 90 wt %, PF SOLN as the binder, and granulated sugar as the porogen. The weight percent of graphite is based on the total mass of graphite and the dry phenol formaldehyde resin, excluding the porogen mass. The porogen concentration in these compositions is 2 parts per hundred parts of graphite and binder. The general trend is that the porosity (proportional to vacuum-fill mass gain) increases with an increase in the graphite concentration in the plate (see FIG. 12a). This is attributed to the decrease in the binder concentration that occurs on increasing the graphite concentration, and the consequent less compact packing of the graphite particles in the plate, leading to the experimentally observed higher porosity. A higher plate porosity is generally associated with lower bubble pressure. But FIG. 12b shows a non-monotonic variation of bubble pressures with graphite concentration. The vacuum-fill bubble pressure is the highest for the plate prepared using 85 wt % graphite in the formulation, attributed to a higher volume density of smaller-sized pores in the plate of this composition.

Figure 13:
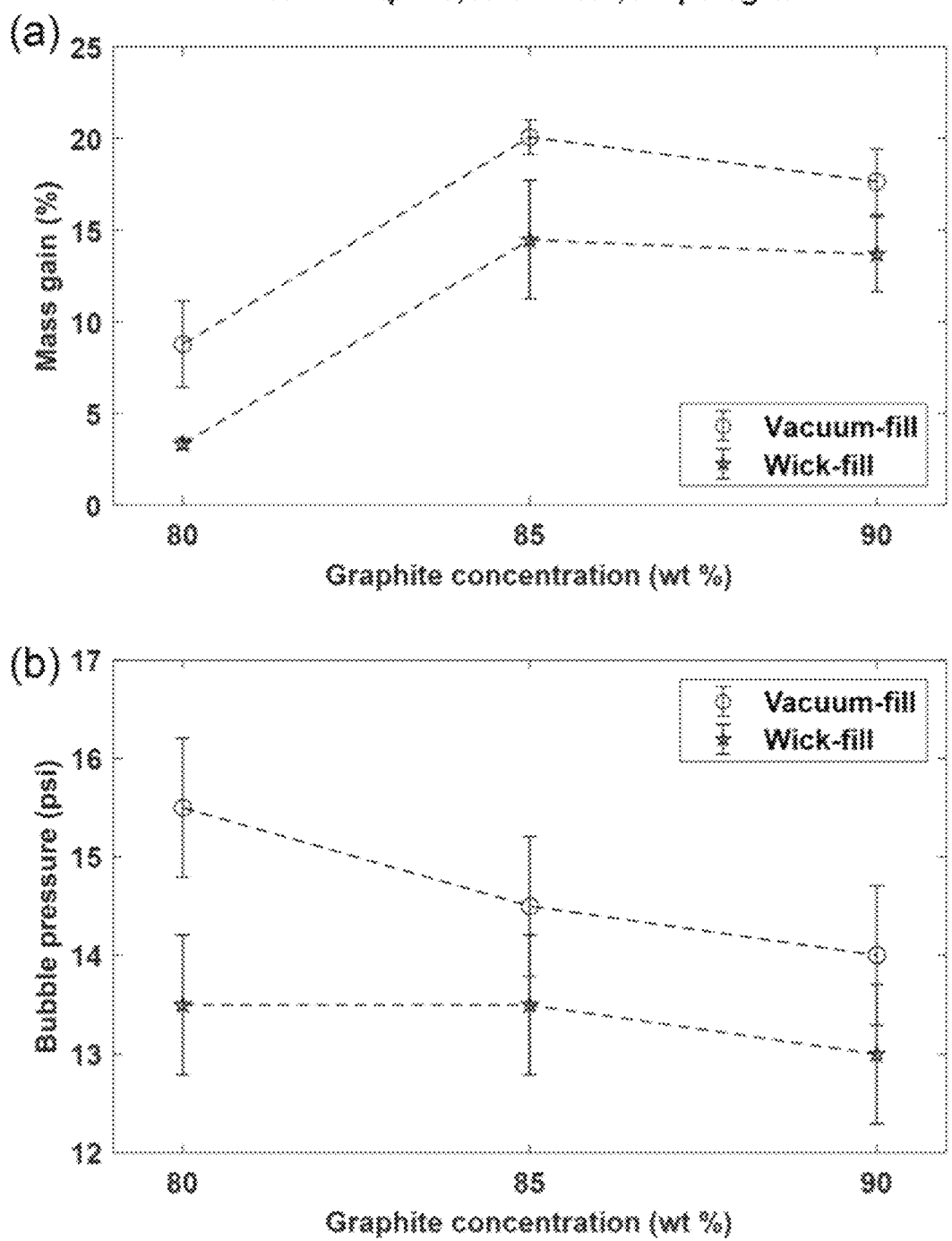
FIG. 13. Effect of 3775 graphite concentration on wick-fill and vacuum-fill mass gains and bubble pressures of plates prepared using RESOL SOLN and no porogen.
Figure 14:
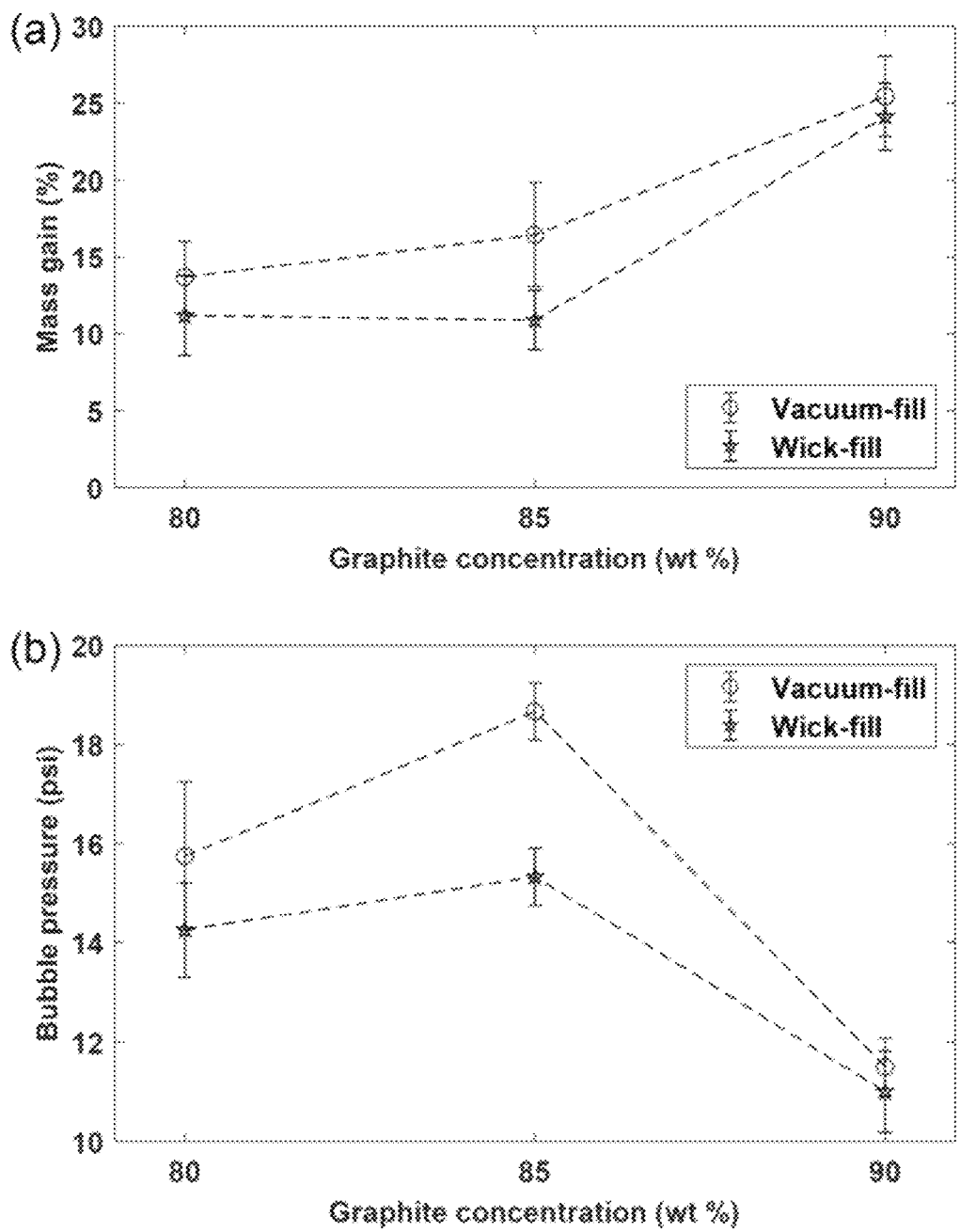
FIG. 14. Effect of 3775 graphite concentration on wick-fill and vacuum-fill mass gains and bubble pressures of plates prepared using PF SOLN and no porogen.

FIG. 13 and FIG. 14 shows the wick-fill and vacuum-fill results for plates prepared using RESOL SOLN and PF SOLN as binders, respectively. No porogen is used in the production of these plates. The porosity (mass gain percent) increases with an increase in the graphite concentration, explained by the looser packing of the graphite particles in the plates because of the correspondingly lower binder concentration. The bubble pressures are higher than 10 psi for all the plates. The plates prepared using PF SOLN binder has the highest bubble pressure when the graphite concentration in the formulation is about 85 wt %.

Example 12

Figure 15:
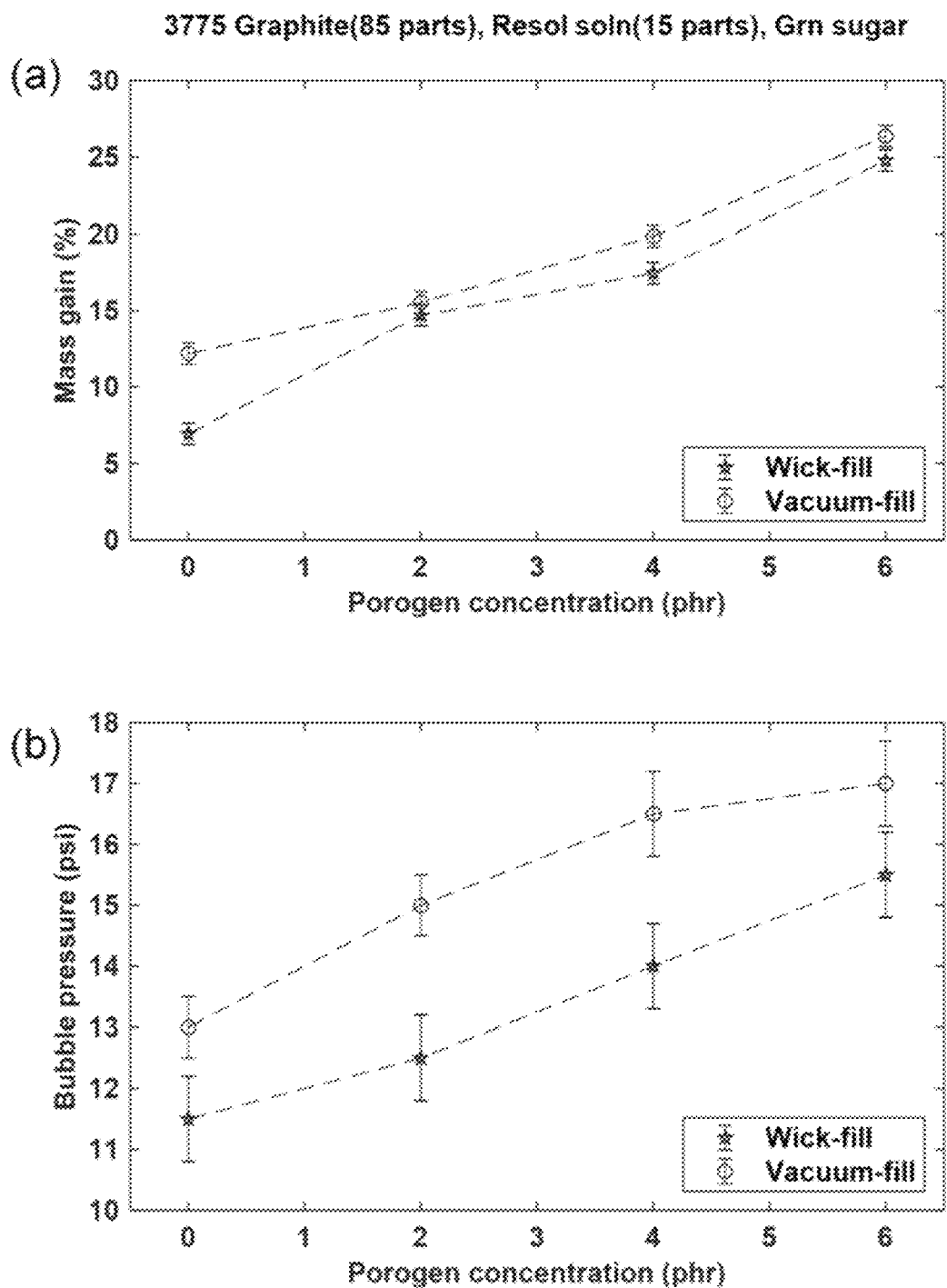
FIG. 15. Effect of granulated sugar porogen concentration on wick-fill and vacuum-fill mass gains and bubble pressures of plates prepared using RESOL SOLN and 3775 graphite.
Figure 16:
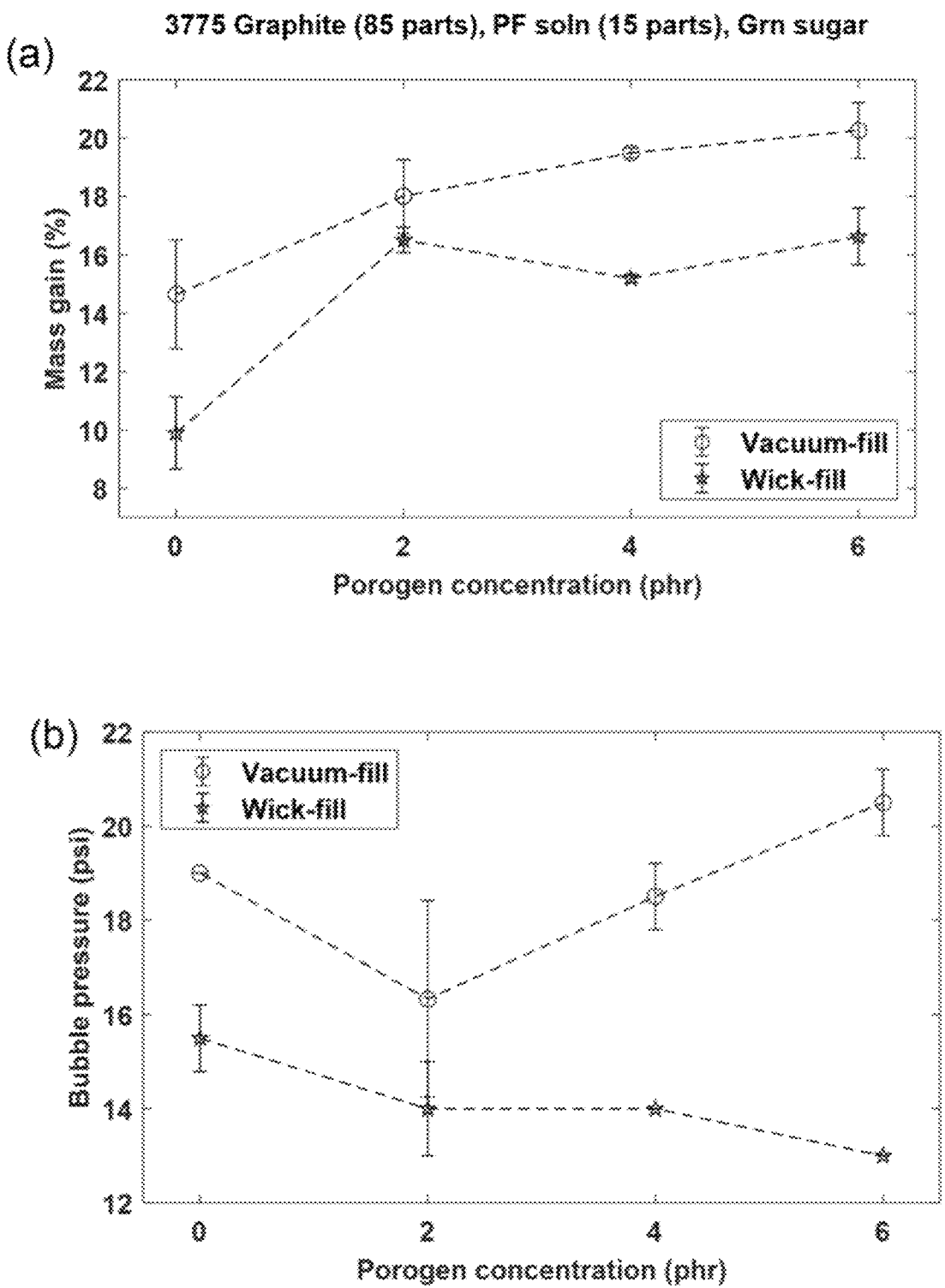
FIG. 16. Effect of granulated sugar porogen concentration on wick-fill and vacuum-fill mass gains and bubble pressures of plates prepared using PF SOLN and 3775 graphite.

Effect of Porogen Concentration on Wick-Fill and Vacuum-Fill Mass Gains and Bubble Pressures in Graphite and Phenol Formaldehyde Resin Composite Plates Prepared Using Sugar Porogen FIG. 15 and FIG. 16 show the effect of the concentration of porogen (granulated sugar) on the wick-fill and vacuum-fill properties of the plates prepared using 3775 graphite, and either the RESOL SOLN (FIG. 15) or the PF SOLN (FIG. 16), as the binder. The mass ratio of graphite to binder was 85:15 (based on the actual polymer mass in the RESOL SOLN and PF SOLN). The porogen concentration was varied in the range of 0 to 6 parts per hundred parts of the combination of graphite and binder.

In the case of the plates prepared using the RESOL SOLN, the vacuum-fill mass gain/bubble pressure and wick-fill mass gain/bubble pressure showed a continuous increase with an increase in the porogen concentration over this range (cf. FIG. 15).

In the case of PF SOLN based plates, the vacuum-fill mass gain showed a continuous increase with an increase in the porogen concentration. The wick-fill mass gain showed an increase when the porogen was introduced in the formulation at a concentration of 2 phr but practically leveled off beyond this concentration. The vacuum-fill mass gain decreased upon the initial introduction of the porogen in the plate but increased almost linearly with porogen concentration in the range of 2 to 6 phr. The wick-fill bubble pressure showed a slight decrease with an increase in porogen concentration (and plate porosity) over this concentration range.

Example 13

Through-Plane Electrical Conductivity

The composite plate is cut to a size of 1 in.×1 in. and placed between the gold-plated copper electrodes of the conductivity measurement cell. The resistance of the plate is fairly low, on the order of a few mΩ. So, even small non-uniformities in contact between the plate and the electrode result in large measurement errors. Hence, carbon cloth, (PANEX 30 carbon fiber fabric, Fuel Cell Store, Texas), cut to 1 in.×1 in. size is used to improve electrical contact of the test plate with the metal electrodes. The cell is connected to a Keithley 2182A nanovoltmeter and a Protek DC power supply (model 3006) for measurement of voltage drop across the plate for different currents. The assembly is clamped in a hydraulic press using 1 ton compressive load. The resistance, R, is calculated from the slope of the linear fits of the voltage vs. current data. Resistivity, $\rho$, is calculated using $\rho=(A \times R)/l$ where A is the contact area and l is the thickness of the plate. The through-plane conductivity is the reciprocal of the resistivity thus calculated.

Figure 17:
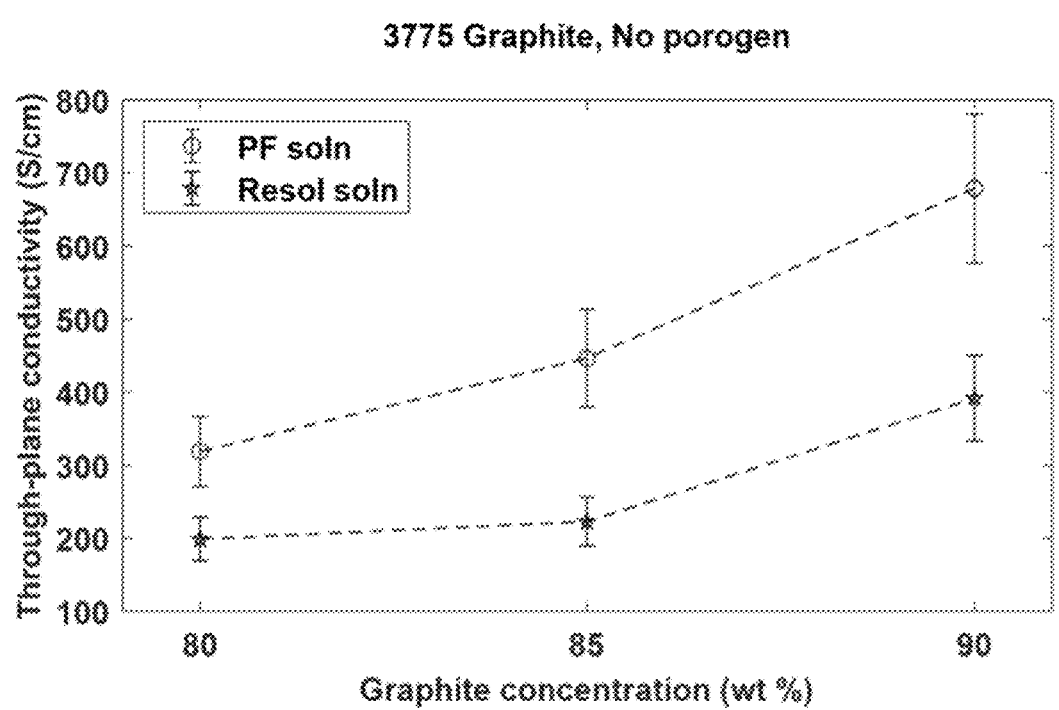
FIG. 17. Effect of 3775 graphite concentration on through-plane electrical conductivity of plates prepared using either PF SOLN or RESOL SOLN and no porogen.

FIG. 17 shows the through-plane conductivity results for plates prepared using either PF SOLN or RESOL SOLN as binders, and different concentrations of 3775 graphite particles. The conductivity increases with an increase in the mass (volume) fraction of the conductive graphite particles in the composite.

Figure 18:
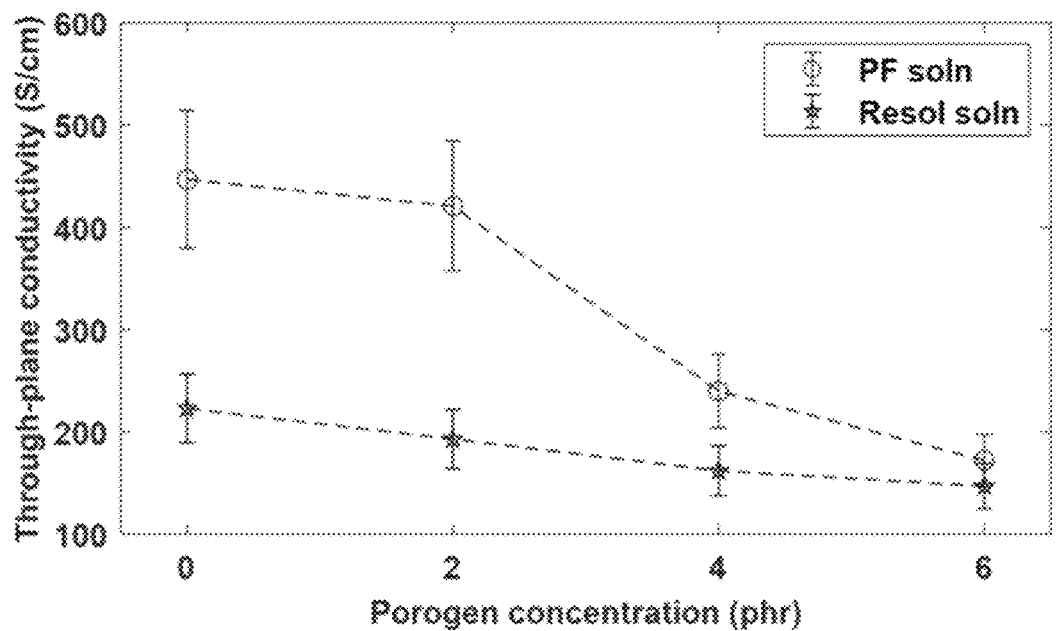
FIG. 18. Effect of granulated sugar porogen concentration on through-plane electrical conductivity of plates prepared using either PF SOLN or RESOL SOLN and 3775 graphite.

FIG. 18 shows the variation of through-plane electrical conductivity with the concentration of porogen. Eight sets of plates, prepared using either the PF SOLN binder or the RESOL SOLN binder, are compared in this figure. The electrical conductivity decreased with an increase in the concentration of porogen in the formulation. This observation is attributed to an increase in the porosity of the plate with an increase in the porogen concentration. The higher volume fraction of non-conductive pores in the plates results in a lower conductivity.

Example 14

Flexural Strength Measurement

The flexural strength of the plates was measured by flexural testing using an Instron 5900R load frame and a three-point bend clamp (3PT bend fixture with 10 mm anvils, Instron OP336-42). In this test, a rectangular piece of specimen is placed on two parallel supporting pins, and the load is applied at the middle of the specimen using a loading pin. The maximum flexural stress sustained by the test sample during the three-point bending test is called flexural strength. The flexural stress, $\sigma_f$ (MPa) is related to the applied load, P, by $\sigma_f=3PL/(2bd^2)$, where P (newtons) is the load at a specific point on the load-deflection curve, L (mm) is the support span length, b (mm) is the width of the specimen, and d (mm) is its thickness.

Figure 19:
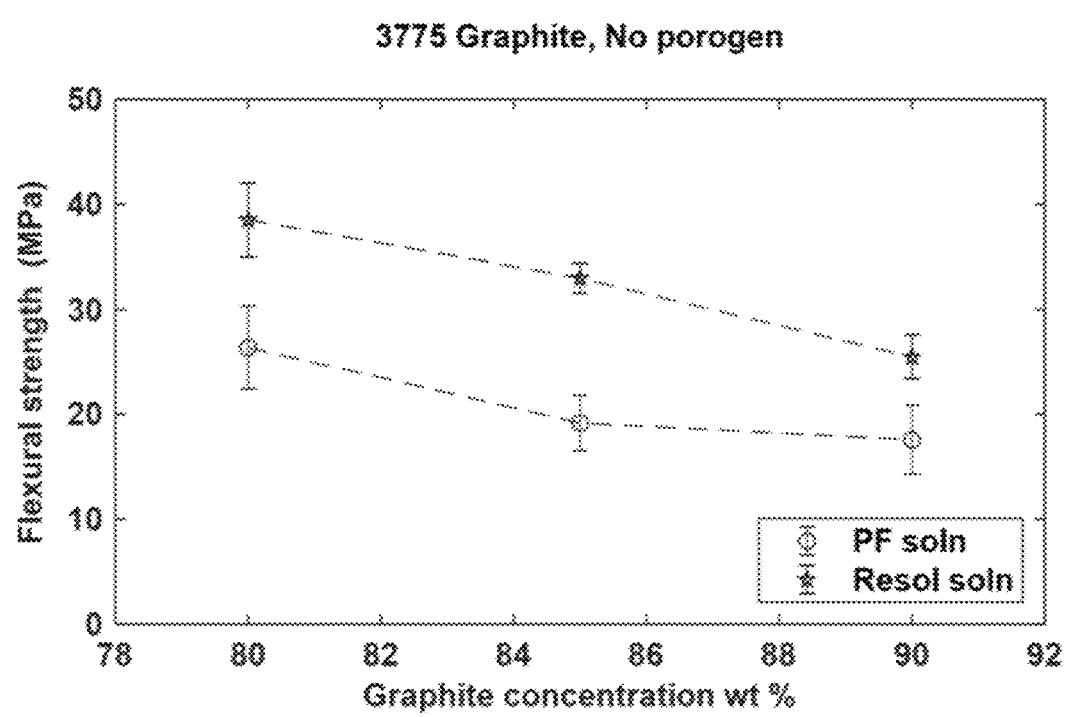
FIG. 19. Effect of 3775 graphite concentration on flexural strength of plates prepared using 3775 graphite (85 wt %) and either PF SOLN or RESOL SOLN as binder (15 wt %).
Figure 20:
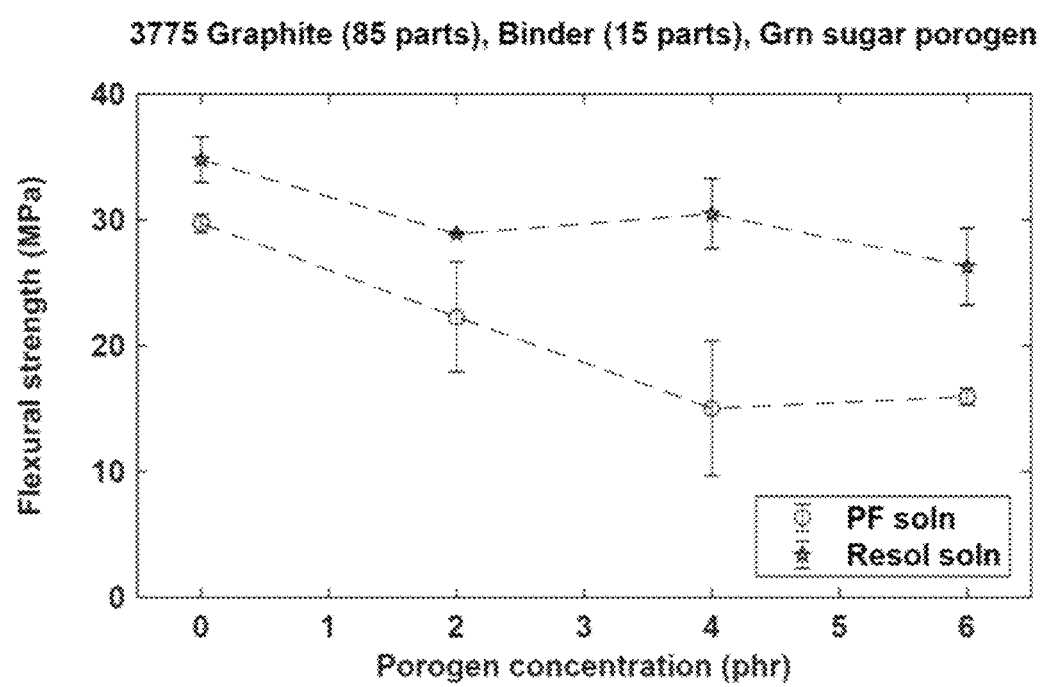
FIG. 20. Effect of granulated sugar porogen concentration on flexural strength of plates prepared using 3775 graphite (85 wt %) and either PF SOLN or RESOL SOLN as binder (15 wt %); porogen concentration is based on parts per hundred parts of graphite and binder.

FIG. 19 shows the flexural strength results for plates prepared without using a porogen, and FIG. 20 shows the flexural strength of plates prepared using granulated sugar as porogen. The 3775 flake graphite was used in all cases. The plates prepared using RESOL SOLN are seen to have higher flexural strength than those prepared using PF SOLN as binder. FIG. 19 shows that the flexural strength decreases with a decrease in the concentration of the binder that is, an increase in the concentration of graphite particles) in the formulation. The flexural strength is also expected to decrease with an increase in the porosity of the plate. This decrease is clearly observed in the case of the PF SOLN plates (see FIG. 20). The decrease is less evident in the case of the RESOL SOLN based plates.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of preparing a porous fuel cell bipolar plate article, the method comprising:
    blending an amount of conductive carbon particles, a polymeric binder, and a porogen to form a paste;
    molding the paste into shape by heating the mold to obtain a plate precursor; and
    removing the porogen from the plate precursor to obtain the porous fuel cell bipolar plate article;
    wherein the porous fuel cell bipolar plate article is characterized by a bubble pressure higher than 15 psi, a wick-fill mass gain between 10 wt % to 60 wt %, a vacuum-fill mass gain between 10 wt % to 70 wt %, an electrical conductivity higher than 100 S/cm, and a flexural strength higher than 25 MPa;
    wherein the amount of conductive carbon particles comprises 75 to 90 wt %, the polymeric binder comprises 10 to 20 wt %, and the porogen comprises up to 15 wt % and is selected from the group consisting of sucrose, salt, and poly(ethylene glycol).

2. The method of preparing a porous fuel cell bipolar plate article of claim 1, wherein in the step of providing a porous fuel cell bipolar plate composition includes mixing the binder and porogen components of the porous fuel cell bipolar plate components to obtain a solution before being combined with the conductive carbon particles to form a paste.

3. The method of preparing a porous fuel cell bipolar plate article according to claim 1, wherein the step of molding the porous fuel cell bipolar plate composition into shape is using a compression molding technique.

4. The method of preparing a porous fuel cell bipolar plate article according to claim 3, wherein the step of compression molding is carried out at an elevated temperature.

5. The method of preparing a porous fuel cell bipolar plate article according to claim 1, wherein a processing temperature range is 100° C. to 300° C.

6. The method of preparing a porous fuel cell bipolar plate article according to claim 1, wherein a processing temperature does not exceed 350° C.

7. The method of preparing a porous fuel cell bipolar plate article according to claim 1, wherein a processing temperature is in the range of 150° C. to 200° C.

8. The porous fuel cell bipolar plate article of claim 1, wherein a relative increase in wick-fill mass gain is in the range of 60% to 70%, and a vacuum-fill mass gain is in the range of 30% to 40% compared with a plate prepared without porogen.

* * * * *